July 14, 1925.
J. C. PAPADOPOULOS
1,546,310
TELEGRAPHONE
Filed May 28, 1923 6 Sheets-Sheet 2
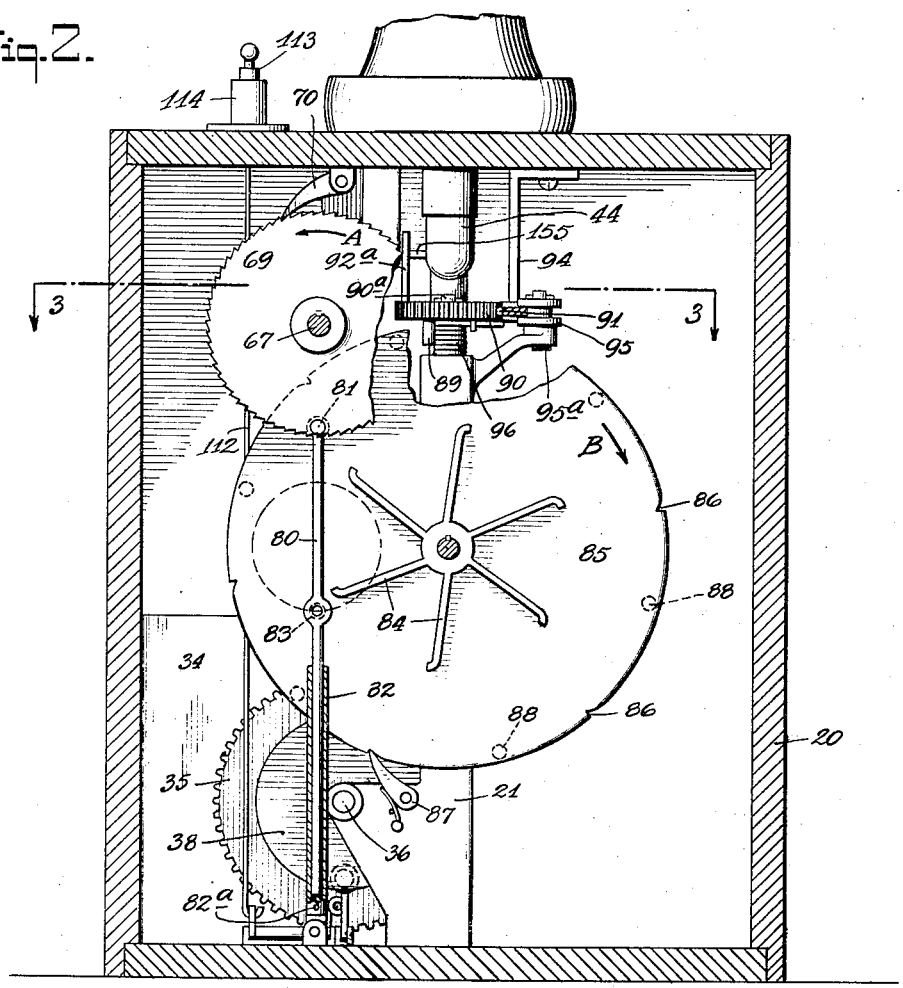
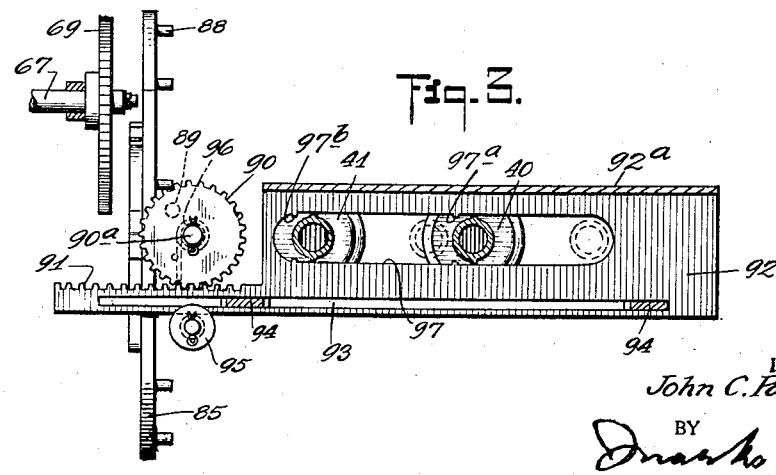
INVENTOR
John C. Papadopoulos
BY
ATTORNEYS.

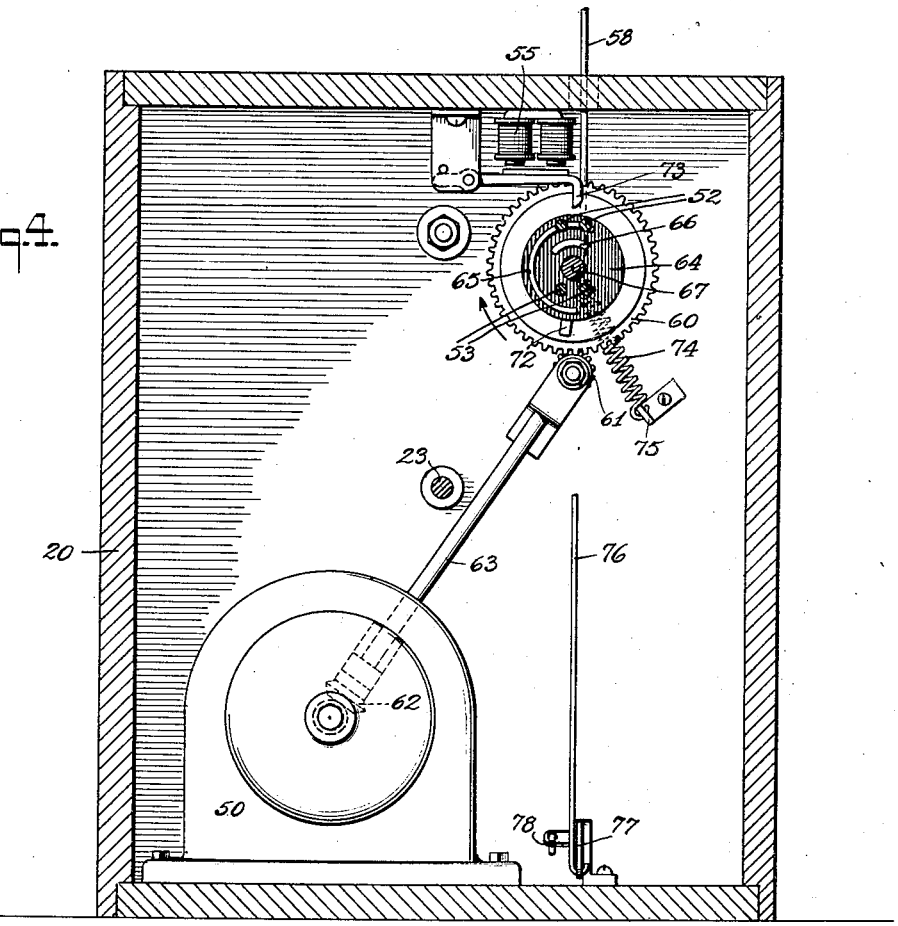
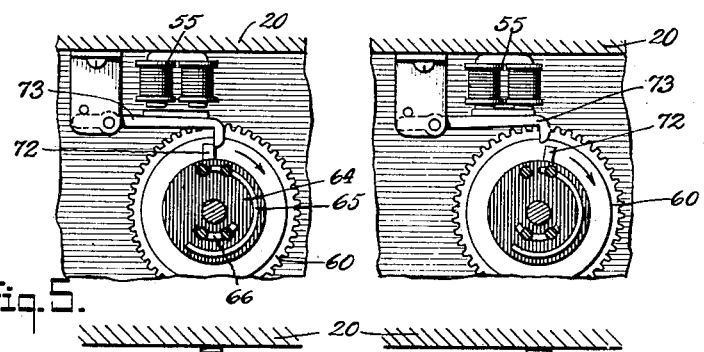

July 14, 1925.
J. C. PAPADOPOULOS
TELEGRAPHONE
Filed May 28, 1923
1,546,310
6 Sheets-Sheet 4
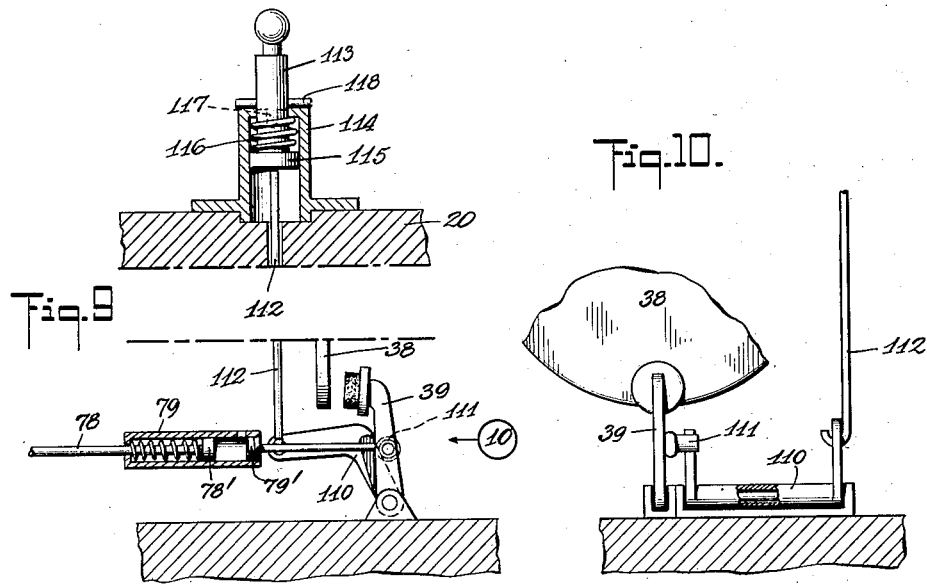
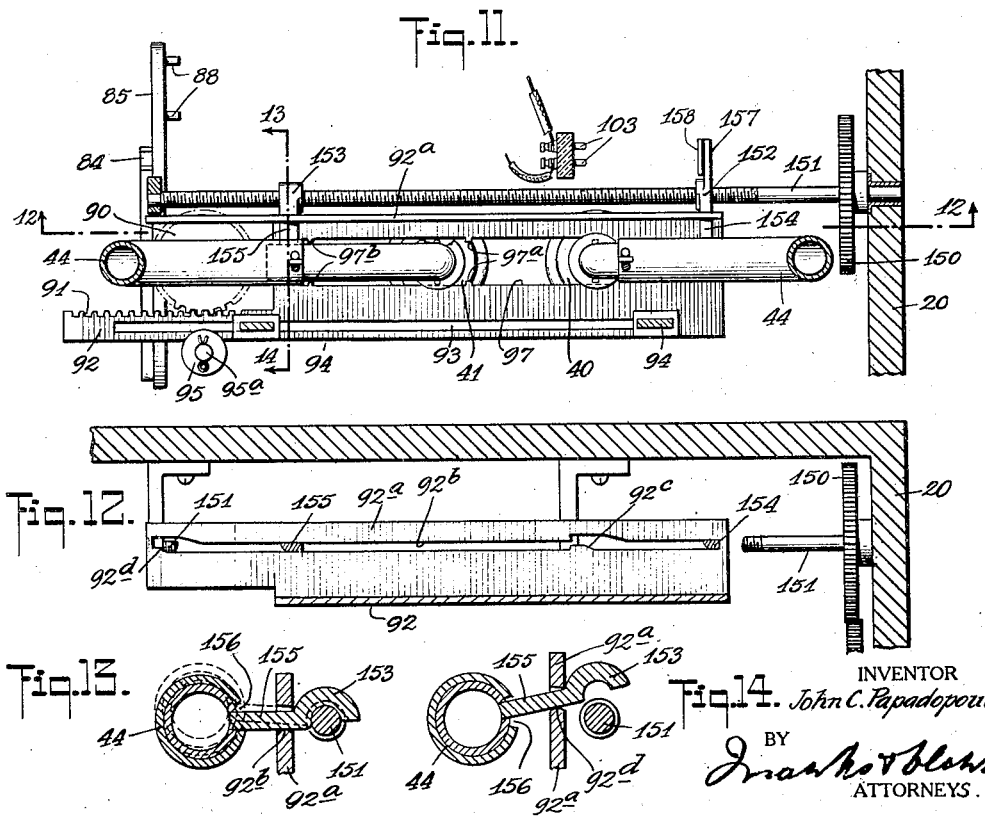
INVENTOR
John C. Papadopoulos
BY
ATTORNEYS.

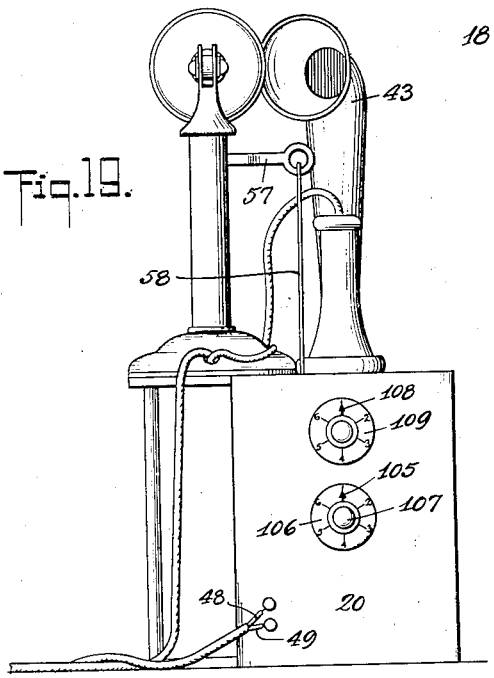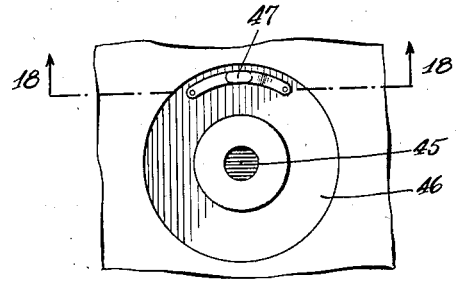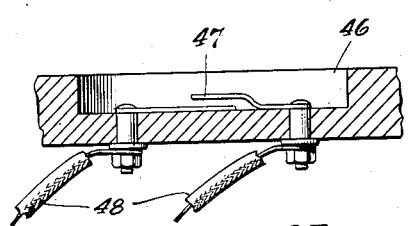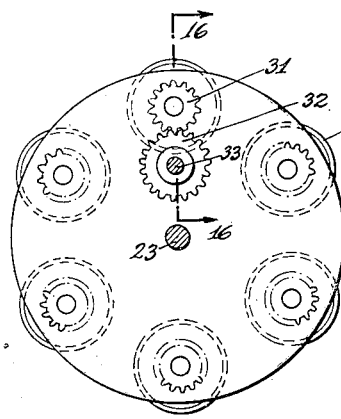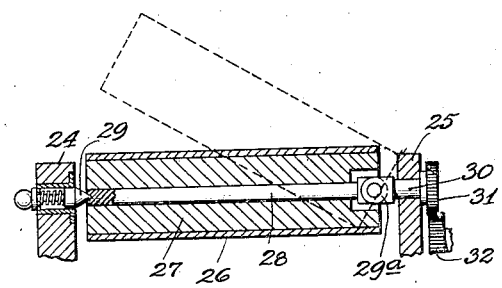

July 14, 1925.

J. C. PAPADOPOULOS

TELEGRAPHONE

Filed May 28, 1923

INVENTOR
John C. Papadopoulos
BY
ATTORNEYS.

Patented July 14, 1925.

1,546,310

UNITED STATES PATENT OFFICE.

JOHN C. PAPADOPOULOS, NOW BY JUDICIAL CHANGE OF NAME, JOHN PAULAS, OF NEW YORK, N. Y.

TELEGRAPHONE.

Application filed May 28, 1923. Serial No. 641,926.

*To all whom it may concern:*

Be it known that JOHN C. PAPADOPOULOS, citizen of United States, residing at 644 West 173rd Street, New York, N. Y., U. S. A., has invented certain new and useful Improvements in Telegraphones, of which the following is a specification.

This invention relates to that class of devices, commonly known as telegraphones, which are adapted to be connected to an ordinary subscriber's telephone instrument, and which are provided with sound recording records which are automatically put in operation when a call is received upon the instrument, so as to enable a message to be received and recorded when the person called is absent. As usually constructed these instruments are provided with separate sending and receiving records, the sending record informing the party calling that the party called is absent and that a message may be delivered which will be recorded and the receiving record will then receive and record the message from the party calling.

The principal object of this invention is to improve upon and simplify the prior constructions of devices of this character by providing a single record for both sending and receiving.

A further object is to provide means by which the weight of the receiver when disconnected is used to complete an electrical controlling circuit through the device. Many other objects will also be apparent to those skilled in the art to which this invention appertains, from a reading of the following disclosure and by reference to the accompanying drawings, forming a part hereof and wherein is shown a preferred embodiment of my invention but it will be understood that such changes, variations and modifications may be resorted to which fall within the scope of the claims hereunto appended.

As shown in the drawings,

Fig. 2 is a section on the line 2—2 of Fig. 1.

Fig. 3 is a section on the line 3—3 of Fig. 2.

Fig. 4 is a section on the line 4—4 of Fig. 1.

Fig. 5 is a partial sectional detail of the automatic stop and switch shown in Fig. 4, but showing the switch in position to cut out the alternating current circuit to the motor.

Fig. 6 is a view similar to Fig. 5 but showing the parts in the position they will occupy after the central operator has switched to the direct current talking circuit.

Figure 1:
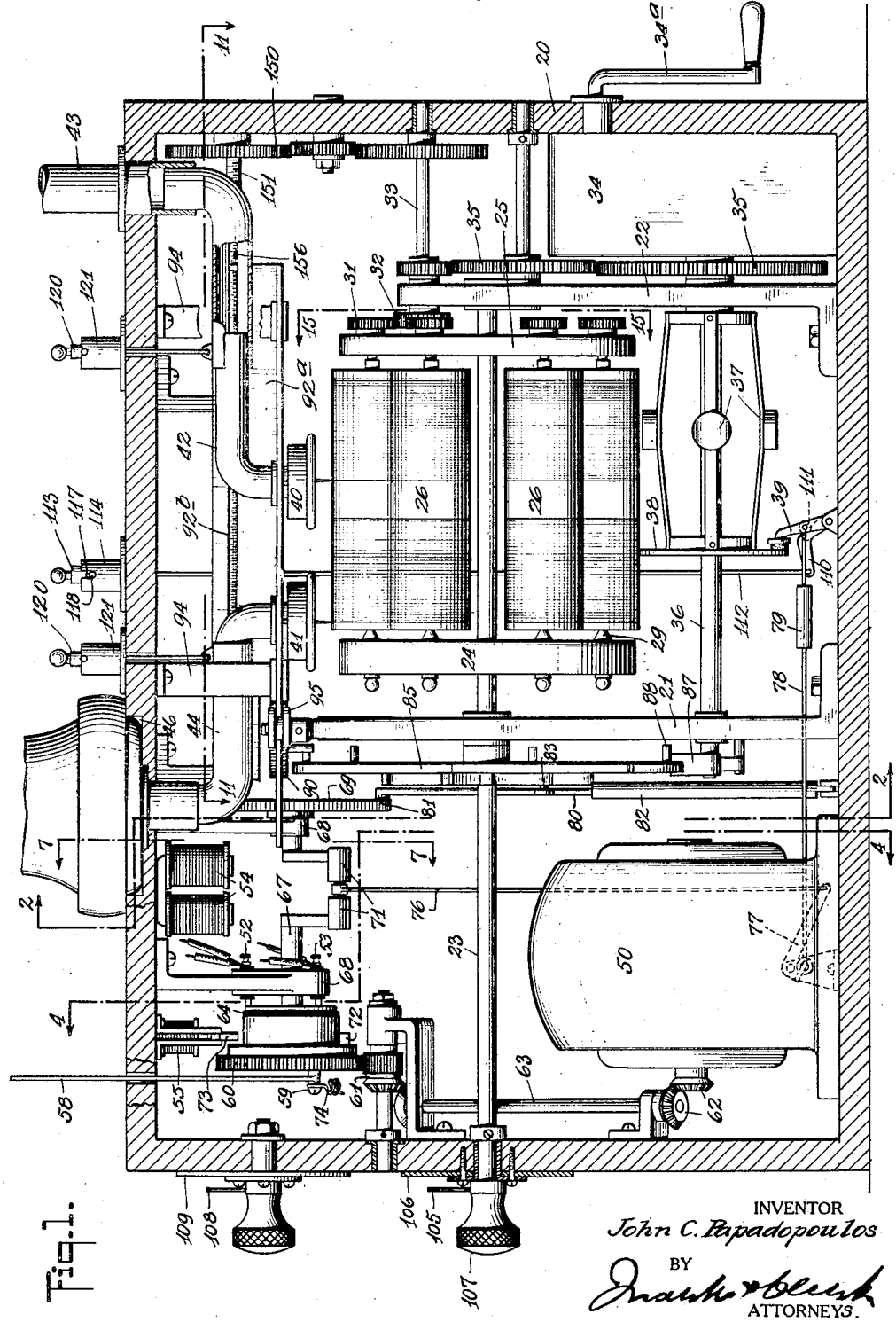
Fig. 1 is a central longitudinal vertical section through the device.

Figs. 7 and 8 are sections on the line 7—7 of Fig. 1 showing the positions of the weighted countershaft corresponding to the positions of the parts shown in Figs. 5 and 6 respectively.

Fig. 9 is an enlarged detail of the parts comprising the manual release for the spring motor to permit the recorded incoming messages to be delivered.

Fig. 10 is a side elevation of the lower portion of the parts shown in Fig. 9 looking in the direction of the arrow.

Fig. 11 is a sectional view taken on the line 11—11 of Fig. 1.

Fig. 12 is a section on the line 12—12 of Fig. 11.

Figs. 13 and 14 are sections on the line 13—14 of Fig. 11 showing the parts in operative and inoperative positions respectively.

Fig. 15 is a section on the line 15—15 of Fig. 1.

Fig. 16 is a section on the line 16—16 of Fig. 15.

Fig. 17 is a plan view of the receiver recess and switch therein.

Fig. 18 is a section on the line 18—18 of Fig. 17.

Fig. 19 is a side elevation of the complete device.

Figure 20:
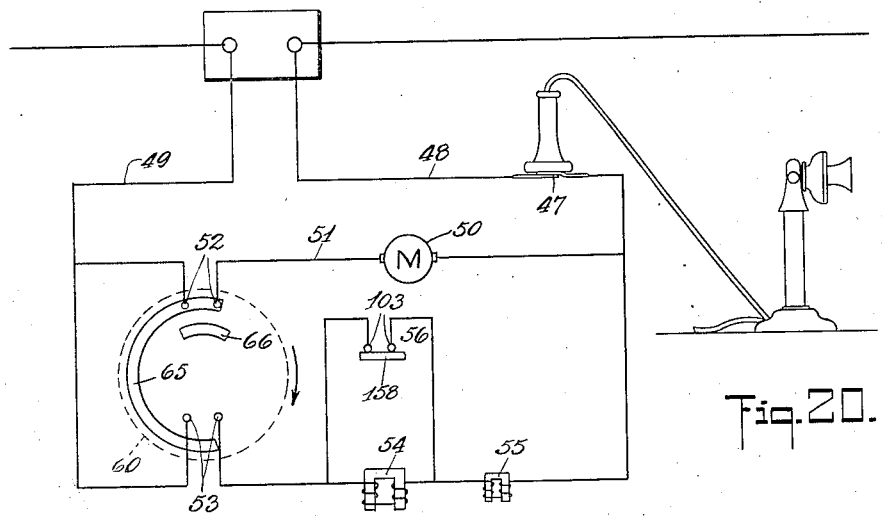
Figure 21:
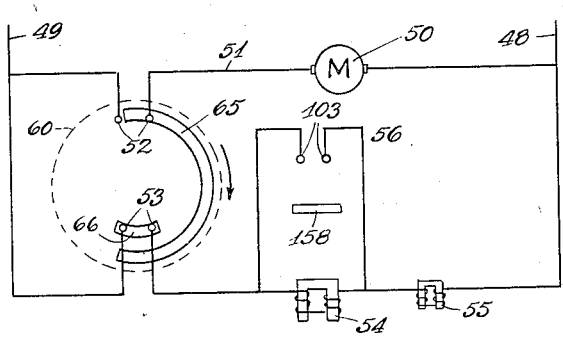
Figure 22:
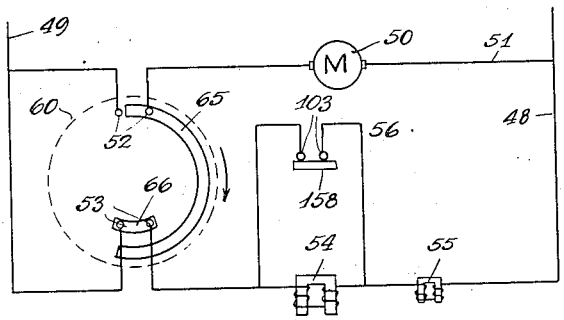

Figs. 20, 21 and 22 are diagrammatic views showing the arrangements of the circuits corresponding to the positions of the parts shown in Figs. 4, 5 and 6 respectively.

As shown in the drawings a casing 20 has secured to the base thereof a pair of brackets 21, 22, in which is journalled a shaft 23 having fixed thereon a pair of record holding disks 24, 25 between which a plurality of records 26 are detachably and rotatably mounted. Each record 26 which consists of the usual wax cylinder is mounted upon a mandrel 27 (see Fig. 16) secured to a shaft 28 one end of which shaft is rotatably supported upon a spring pressed center 29 seated in disk 24, and the other end of which is connected by means of a universal joint 29ᵃ with a short shaft 30 journalled in disk 25 and having the gear 31 secured thereto. The gear 31 of each mandrel is adapted when brought to the top position shown in Fig. 15 to mesh with an intermediate gear 32 mounted upon a shaft 33, suitably journalled in the casing 20 and bracket 22, and which gear is driven from the spring motor 34 by means of the gearing 35, the spring motor being provided with the usual winding key 34ᵃ. Upon the shaft 36 of the spring motor is secured a centrifugal governor 37 of any suitable type having a brake disk 38 secured thereto with which disk the brake rod 39 is adapted to be engaged or disengaged by means to be hereinafter described.

Suspended from the lower side of the top of the casing 20 are a pair of sound boxes 40 and 41 each provided with a stylus or needle adapted to contact with the top record 26 when the record has been brought to the uppermost limit by the rotation of the disks 24 and 25. The sound box 40 is in communication by means of a sliding telescopic conduit 42 with a sounding horn 43 adapted to be directed towards the transmitter of the telephone to transmit from the record 26, any suitable message to the party calling, while the sound box 41 is in communication through a similar conduit 44 with the orifice 45 (see Fig. 17) centrally disposed in a recess 46 in the top of the casing and in which the telephone receiver is adapted to be placed, the incoming messages being delivered from the receiver through the conduit 44 to the sound box 41 to be recorded by the stylus upon the record 26.

Means are provided for feeding the sound boxes across the records and comprises a train of gearing 150 driven by the spring motor 34 from shaft 33, said gearing driving a feed screw 151 with which engages the half nuts 152 and 153 (see Figs. 11, 13 and 14) formed in the ends of arms 154 and 155 which project outwardly from the inner slidable members of conduits 42 and 44 respectively, to the outer or free ends of which members the sound boxes are secured. A slot 156 is provided in the outer conduit members as shown in Figs. 11, 13 and 14, to permit sufficient movement of the arms to disengage the nuts 152 and 153 from the screw 151 when desired.

Secured within the recess 46 is a switch 47 which is adapted to be closed by the weight of the receiver when it is placed in the recess as shown in Fig. 1 of the drawing, thus permitting current to flow through the branch 48 of the circuit shown diagrammatically in Fig. 20 of the drawing. Branches 48 and 49 of this circuit are connected across the telephone line which, as is well known, uses an alternating current to ring the signal bell and a direct current for the sounding of talking current, the change from alternating to the direct current being made by the central operator after the signal at the central board indicates that the receiver has been lifted from the receiver hook. My invention contemplates the use of the signalling alternating current to actuate mechanism for automatically starting the recording mechanism and for this purpose a small alternating current motor 50 is connected in the branch or shunt 51 which branch has interposed therein the spaced terminals 52 of a switch which for clearness shall be hereinafter referred to as the A. C. switch. The branches 48 and 49 terminate at and are secured to the terminals 53 of a switch which shall be hereinafter referred to as the D. C. switch, and a pair of electro-magnets 54 and 55 are interposed in the branch 48, a short circuiting switch or timer being shunted around the magnet 54 all for a purpose which shall be hereinafter set forth.

Connected at its upper end to the receiver hook 57 (see Figs. 1 and 19) is a connecting rod 58, the lower end of which is pivotally secured to a crank pin 59 extending laterally from the face of a spur gear 60 meshing with a combined spur pinion and bevel gear 61 which is driven from the motor 50 by means of the bevel gearing 62 and shaft 63.

The hub of gear 60 has secured thereto a block of insulating material 64 (see Figs. 1 and 4) upon which is secured the contact plates 65 and 66 for the A. C. and D. C. switches respectively. Gear 60 is secured to one end of a crank shaft 67 journalled in suitable brackets 68 depending from the top of the casing and the other end of the crank shaft 67 has secured thereto a ratchet wheel 69 (see Figs. 1 and 2) adapted to be engaged by a pawl 70. When A. C. current is sent through the telephone line to operate the signal bell the motor 50 will be actuated, thereby driving gear 60 and rotating crank shaft 67. The rotation of gear 60 will raise connecting link 58 until the receiver hook has been raised sufficiently to signal the central operator that the line is closed. The location of the crank pin 59 and the throw of crank shaft 67 are so proportioned that the switch within the telephone which is operated by the receiver hook will not be thrown until the heads 71 of the crank shaft have been moved nearly to their uppermost position as shown in Fig. 7 in which position a stop 72 (see Figs. 1, and 4 to 6 inclusive) projecting from the hub of gear 60 has just moved into contact with a pivoted latch 73. The heads 71 of the crank shaft are weighted as clearly shown in Figs. 7 and 8 so that when they have moved to their top positions the right hand side will overbalance and tend to cause the crank shaft to continue its rotation, which tendency is also assisted by the coiled spring 74, one end of which is secured to crank pin 59 and the other end of which is suitably anchored as at 75 to a suitable bracket secured to the casing. As the operation of the A. C. current is intermittent the rod 58 will be moved upwardly by stages until the signal is received by the central operator that the line is closed, central will then plug in to the D. C. current which as shown in Fig. 21 will pass through the electro-magnets 54 and 55. When magnet 55 is operated it will draw latch 73 out of engagement with the stop 72, the engagement of the stop and latch having occurred when weighted head 71 is in the position shown in Fig. 7. It will also be seen from Figs. 5 and 21 that the contact plate 65 of the A. C. switch has just moved out of engagement with one of its terminals 52, while contact plate 66 of the D. C. switch is across the terminals 53, so that even if central continues to signal no further operation of the motor 50 will occur. During the intermittent upward rotation of the crank shaft the engagement of the pawl 70 with ratchet 69 will prevent reverse movement of the crank shaft by the weighted heads and spring 74. As latch 73 is released by magnet 55, magnet 54 is also energized, and as there is a slight air gap between head 71 and the pole piece of the magnet, head 71 will be immediately pulled to the position shown in Fig. 8, thus causing the stop 72 to be pulled past latch 73 so as to prevent further operative engagement thereof until the crank shaft makes another revolution.

Pivotally secured to the center of crank shaft 67 between the heads 71 is a connecting link 76, the lower end of which is pivoted to the longer arm of a bell crank 77 (see Fig. 1), and the shorter arm of which is connected by rod 78, having a lost motion connection 79 therein, to the brake lever 39. The lost motion connection 79 (see Fig. 9) is so constructed that as rod 78 is pushed to the right (in Figs. 1 and 9) by the upward movement of rod 76, the enlarged head 78' will not engage the head 79' to cause release of the brake 39 until countershaft 67 and heads 71 have reached the position shown in Fig. 8.

Means are provided for automatically rotating the shaft 23 with disks 24, 25, to bring a fresh record to operative position and said means comprises a rod 80 (see Figs. 1 and 2) connected at its upper end to a crank pin 81 projecting from ratchet wheel 69. The lower end of rod 80 slides in tube 82 pivotally secured to the bottom of the casing 20, and which tube is provided with an air relief vent 82ª. Intermediate its ends rod 80 is provided with a pin 83 which obviously will rotate about the small dotted circle shown in Fig. 2, and will engage during a portion of its revolution with the ribs 84 which project laterally from a disk 85 fixed to shaft 23, said ribs radiating from the axis of shaft 23 and there being a rib 84 for each record 26, so that the actuation of the shaft 23 will be just sufficient to bring a fresh record to position. To ensure that the record will be properly held in position the periphery of disk 85 is provided with a notch 86 corresponding to each record and a spring pressed pawl 87 pivoted to bracket 21 is adapted to engage within each notch as its corresponding record is brought to operative position.

Means are provided for returning the sound boxes 40 and 41 to initial position and comprises a plurality of pins 88 projecting laterally from the face of disc 85 opposite to the ribs 84. Each pin 88 as it reaches the top of its travel is adapted to engage a downwardly extending pin 89 (see Figs. 1, 2 and 3) projecting from the face of a rack gear 90, rotatably mounted upon a short shaft 90ª upon the upper end of bracket 21, and having its teeth in mesh with the rack teeth 91 provided upon a slide 92. The slide 92 is provided with an elongated guide slot 93 slidably engaged with the yoke arms of a pair of guide brackets 94 to prevent vertical displacement of the slide, while horizontal displacement of the slide is prevented by the vertically extending arms of the guide brackets and a grooved roller 95 rotatably mounted upon a stub shaft 95ª the axis of which is in alignment with the axis of rack gear 90. A torsion spring 96 is coiled about shaft 90ª and is arranged to cause the rack gear to normally hold the slide 92 in the position shown in Figs. 1, 3, 11 and 12. Slide 92 is provided with an elongated slot 97 having the inwardly extending projections 97ª and 97ᵇ (see Fig. 11) adapted to engage the sound boxes 40 and 41, respectively and push them towards the right (see Figs. 1, 11 and 12) thus returning the boxes to their original positions. Slide 92 is also provided with a vertically extending portion 92ª having a horizontally extending slot 92ᵇ therein, said slot having a pair of raised cam portions 92ᶜ and 92ᵈ therein to engage arms 154 and 155 respectively, these cam portions engaging and raising the arms and consequently releasing the nuts 152 and 153 just before the projections 97ª and 97ᵇ engage the sound boxes 40 and 41.

Means are provided for stopping the rotation of spring motor 34 and cutting out the telephone circuit when the sound boxes 40 and 41 have reached the end of their travel towards the left and said means consists of a finger 157 projecting outwardly from nut 152, said finger being provided with a contact plate 158 which is adapted to bridge across the terminals 103 to short circuit the electromagnet 54 and thereby permit crank shaft 67 to drop, thus cutting out the line.

Referring to Fig. 1 it will be noted that shaft 23 is extended through the wall of casing 20 and is provided at its outer end with a pointer 105 which rotates in front of a dial 106 which is provided with numerals suitably arranged to correspond with the operative positions of the various records 26. A knurled thumb piece 107 is secured upon the projecting end of shaft 23 to permit the shaft to be manually rotated when desired. A similar pointer 108 and dial 109 are provided for use as an indicating memorandum.

Means are provided to permit the spring motor to be set in operation independently of the automatic electrical control and these means comprise a small bell crank 110 (see Figs. 1, 9 and 10) pivoted upon the same axis as the brake lever 39, the shorter arm of the bell crank 110 being adapted to engage a pin 111 projecting from the side of brake lever 39, and the longer arm of the bell crank having secured thereto the lower end of a connecting link 112, the upper end of which has secured thereto a finger grip 113 slidably mounted within a hollow cap 114 seated in the top face of the casing.

The finger grip 113 has an enlarged shoulder 115 between which and the inwardly extending upper flange of the cap 114 a coiled compression spring 116 is arranged to normally urge the finger grip 113 and link 112 downwardly with the bell crank 110 out of engagement with pin 111. Cap 114 is provided with a pair of diametrically opposed slots 117 with which a pin 118 extending through the finger grip is adapted to engage, the pin 118 when in the position shown in Fig. 9 corresponding to the operative position of the bell crank 110 when the brake 39 is released from disk 38, and when in the position shown in Fig. 1 corresponding to the inoperative position of the bell crank 110.

Similar finger grip and cap constructions 120 and 121 are provided for raising the sound boxes 40 and 41 and their needles off the record, there being sufficient play between the sound box and the bottom of plate 92 to permit a sufficient upward movement of the boxes for this purpose.

The operation of the device is as follows, assuming that a telephone subscriber intends to be absent the spring motor 34 will be wound and the memorandum indicator 108—109 will be set to agree with indicator 107, the telephone receiver will be then taken off the hook 57 and placed within the recess 46, thus closing switch 47 and completing circuit in branch 48 (the circuits and controls being now as indicated in Fig. 20). It will be understood that a suitable number of records 26 have been placed upon the machine, each of which record is preferably provided with a suitable message, to be delivered to the partly calling, announcing the absence of the subscriber and directing that a message may be left. Such a message may be dictated by the subscriber by raising sound box 41 and operating spring motor with only the needle of sound box 40 engaged, the message being dictated into sounding horn 43.

When the central operator calls, the A. C. signalling current will actuate motor 50, causing crank shaft 67 to be rotated from the position shown in Fig. 1 to the position shown in Fig. 7 at which time the usual receiver hook switch, signals central that the line is closed, the ratchet wheel 69 and pawl 70 holding the weighted head 71 and crank shaft in the upper position until the D. C. current is plugged in. When D. C. current passes the electromagnets 54 and 55 will be operated, magnet 55 raising latch 73 out of engagement with stop 72 and the force of the magnetic attraction of magnet 54 pulling the head 71 to the position shown in Fig. 8. The upward movement of crank shaft 67 communicates movement to the rod 78 which through lost motion connection 79 prevents contact of the heads 78' and 79' and release of the brake 39 until the final movement of the head 71 to the position in Fig. 8 occurs.

The release of brake 39 permits the rotation of the spring motor and of the topmost record 26 with which the styluses or needles of sound boxes 40 and 41 are now engaged, the outgoing message being delivered by sound box 40 through its conduit 42 and sound horn 43 to the transmitter and the incoming message being delivered by the receiver through conduit 44 to sound box 41 to be impressed upon the record 26.

As the crank shaft 67 is rotating upwardly the ratchet wheel 69 will also be rotated in the direction of the arrow (Fig. 2) pin 81 moving rod 80 to cause pin 83 to move around the circular path indicated by the dotted line, the pin 81 engaging one of the ribs 84 as will be readily understood to move the disk 85 through one sixth of a revolution in the direction of arrow B, thus causing shaft 23, with disks 24, 25, carrying the records 26 to be rotated an equal amount, thereby moving the record 26 which was in engagement with the needles out of operative position and bringing the next record up to operative position, at which point pawl 87 will engage within the next notch 86 to hold the shaft 23 in position. As clearly shown in Fig. 2 the upper left hand pin 88 will engage depending pin 89 shortly after the rotation of shaft 23 has started thereby rotating rack gear 90 and causing the slide 92 to move the sound boxes 40 and 41 from the full line positions shown in Fig. 3 to the dotted line positions, this movement of the sound boxes occurring after the top record has been moved from under the needles, and before the next record 26 engages therewith, the return movement of the slide 92 caused by the torsion spring 96 has been completed.

The circuits and controls are now as indicated in Fig. 21, the A. C. switch contact plate 65 being in contact with only one of the terminals 52, D. C. switch plate 66 being across terminals 53 and the timer switch plate 158 out of contact with the terminals 103. As pointed out above spring motor 34 has been released and the top record 26 is rotating. During the rotation of the record 26 the sliding members of the conduits 42 and 44 will be fed gradually by the screw 151 and nuts 152 and 153 towards the left in Fig. 1 and just as the needles reach the end of the record the contact plate 158 will bridge across the yielding terminals 103. This will cause the electromagnet 54 to be short circuited thus releasing head 71, which by its overbalanced weight assisted by spring 74 will rotate the crank shaft 67 downwardly in the direction of the arrows in Figs. 7 and 8; connecting link 76 and its associated parts, applying brake lever 39 and stopping the rotation of spring motor 34 and records 26. The stopping of the spring motor 34 will also be effected by the central operator cutting off the D. C. current, thus deenergizing magnet 54.

When the subscriber returns, the messages which have been recorded in his absence may be listened to by removing the receiver from the recess 46 and by placing any suitable sound transmitting device in the recess or by placing the ear thereto, sound box 40 first being lifted out of engagement with the record, then turning shaft 23 by means of thumb piece 107 to the desired graduation, and finally releasing the spring motor by raising finger grip 113. It will be understood that the thumb piece must be turned to move shaft 23 in the direction of the arrow B in Fig. 2 so as to cause the sound box 41 to be returned to its initial position by the pins 88 and 89.

Having thus described my invention what I claim as new and desire to secure by Letters Patent is:

1. The combination with a subscriber's telephone set, of means for automatically reproducing an outgoing message and simultaneously recording an incoming message, said means comprising a record having a portion thereof provided with the message to be reproduced and the remaining portion thereof blank to receive the incoming message, a cooperating sound box for each of said portions of said record, and means to operate said record.

2. The combination with a subscriber's telephone set of means for simultaneously reproducing an outgoing message and recording an incoming message, said means comprising a record having one portion thereof provided with the message to be reproduced and another portion thereof blank to receive the incoming message, a cooperating sound box for each of said portions of said record, means to operate said record, and controlling means actuated by the alternating signalling current of the telephone circuit to cause the record operating means to be placed in operation.

3. The combination with a subscriber's telephone set, of means for simultaneously reproducing an outgoing message and recording an incoming message, said means comprising a rotatable support, a plurality of records rotatably mounted on said support, means operative to rotate one of said records when said support is in a predetermined position and means operated by the signalling alternating current of the telephone circuit to rotate said rotatable support.

4. The combination with a subscriber's telephone set, of means for simultaneously reproducing an outgoing message and recording an incoming message, said means comprising a rotatable support, a plurality of records rotatably mounted on said support, means operative to rotate one of said records when said support is in a predetermined position, means operated by the signalling alternating current of the telephone circuit to rotate said rotatable support, said last named means including means to control the actuation of said record rotating means.

5. The combination with a subscriber's telephone set, of means for simultaneously reproducing an outgoing message and recording an incoming message, said means comprising a rotatable support, a plurality of records rotatably mounted on said support, means operative to rotate one of said records when said support is in a predetermined position, means operated by the signalling alternating current to rotate said rotatable support and move it to said predetermined position and yielding means to lock said support in said position.

6. The combination with a subscriber's telephone set, of means for simultaneously reproducing an outgoing message and recording an incoming message, said means comprising a rotatable support, a plurality of records rotatably mounted on said support, means operative to rotate one of said records when said support is in a predetermined position, a pair of sound boxes adapted to be operatively and simultaneously engaged with the operative one of said records when said support is in said predetermined position, means to simultaneously feed said sound boxes across said operative record and means operated by the signalling alternating current of the telephone circuit to cause said support to be brought to said predetermined position, said last named means including means to release said sound box feeding means and return said sound boxes to their initial starting position.

7. The combination with a subscriber's telephone set, of means for simultaneously reproducing an outgoing message and recording an incoming message, said means comprising a rotatable support, a plurality of records rotatably mounted on said support, means operative to rotate one of said records when said support is in a predetermined position, a pair of sound boxes adapted to be operatively and simultaneously engaged with the operative one of said records when said support is in said predetermined position, means to simultaneously feed said sound boxes across said operative record and means operated by the signalling alternating current of the telephone circuit to cause said support to be brought to said predetermined position, said last named means including means to release said sound box feeding means and return said sound boxes to their initial starting position and means to control the actuation of said record rotating means.

8. The combination with a subscriber's telephone set, of means for simultaneously reproducing an outgoing message and recording an incoming message, said means comprising a rotatable support, a plurality of records rotatably mounted on said support, a motor, means driven by said motor operative to rotate one of said records when said support is in a predetermined position, a pair of sound boxes adapted to be operatively engaged with the rotating record when said support has reached said position, releasable feeding means for said sound boxes driven by said motor, means actuated by the signalling current of the telephone circuit to rotate said support, and means actuated by the last named means during the initial movement thereof to cause said feeding means to be released and said sound boxes to be returned to their starting position.

9. The combination with a subscriber's telephone set, of means for simultaneously reproducing an outgoing message and recording an incoming message, said means comprising a rotatable support, a plurality of records rotatably mounted on said support, means to drive one of said records when said support is in a predetermined position, a motor actuated by the signalling current of the telephone circuit, a weighted controlling device actuated by said motor in an upward direction and in a downward direction by the force of gravity, connections between said controlling device and the receiver of the telephone, an electromagnet energized by the talking current of the telephone circuit to hold said controlling device in its upper position, means operated by said controlling device during its upward travel to rotate said support and means connected with said controlling device to cause said record rotating means to be actuated.

10. The combination with a subscriber's telephone set, of means for simultaneously reproducing an outgoing message and recording an incoming message, said means comprising a rotatable support, a plurality of records rotatably mounted on said support, means to drive one of said records when said support is in a predetermined position, a motor actuated by the signalling current of the telephone circuit, a weighted controlling device actuated by said motor in an upward direction and in a downward direction by the force of gravity, connections between said controlling device and the receiver hook of the telephone, an electro-magnet energized by the talking current of the telephone circuit to hold said controlling device in its upper position, means operated by said controlling device during its upward travel to rotate said support and means connected with said controlling device to cause said record rotating means to be actuated, said last mentioned means including a lost motion connection to prevent actuation of said record rotating means before said electromagnet has been energized.

11. The combination with a telephone subscriber's set, of means for simultaneously reproducing an outgoing message and recording an incoming message, said means including a rotatable record, a pair of sound boxes adapted to be simultaneously engaged with said record, means to rotate said record, means operating in timed relationship with said record rotating means to feed said sound boxes across said record, electromagnetic means adapted to be energized by the talking circuit of the telephone, and means actuated thereby to permit rotation of said record rotating means when said magnet is energized and to prevent rotation thereof when said magnet is deenergized.

12. A combination as set forth in claim 11 in which the means to feed said sound boxes across said record is provided with a contact plate adapted to engage a pair of contacts when said sound boxes have reached the end of their travel and produce a shunted circuit about said magnet whereby said magnet will be deenergized and the rotation of said record rotating means will be stopped.

13. A combination as set forth in claim 11 in which manually operable means adapted to be operated independently of said electromagnet is provided for controlling the rotation of said record rotating means.

14. In a telegraphone of the type having means for recording an incoming message and reproducing an outgoing message, a rotatable record, record rotating means, controlling means, means actuated by the signalling current of the telephone circuit to actuate said controlling means and mechanical connections between the receiver hook of the telephone and said controlling means to cause said receiver hook to be raised by the actuation of said controlling means.

15. In a telegraphone of the type wherein an incoming telephone message is recorded and an outgoing message is reproduced, a rotatable record, record rotating means, electro-magnetic means energized by the talking current of the telephone circuit, controlling means normally held in a lower position and movable to an upper position within the range of magnetic attraction of said electro-magnetic means, and said controlling means including a member to engage said record rotating means and stop the rotation thereof when said controlling means is in its lower position and to be disengaged from said record rotating means to permit the rotation thereof when said controlling means is in its upper position.

16. In a telegraphone of the type wherein an incoming telephone message is recorded and an outgoing message is reproduced, a rotatable record, record rotating means, a pair of sound boxes adapted to be engaged with said record, means operating in timed relationship with said record rotating means to feed said sound boxes across said record, electromagnetic means energized by the talking current of the telephone circuit, controlling means normally held in a lower position and movable to an upper position by the signalling current of the telephone line, in which upper position a portion of said controlling means is within the range of attraction of said electro-magnetic means, said controlling means including a member to engage said record rotating means and stop the rotation thereof when said controlling means is in its lower position and said member being disengaged from said record rotating means to permit the rotation thereof when said controlling means is in its upper position.

17. The combination with a subscriber's telephone set, of means to automatically cause an outgoing message to be reproduced and an incoming message to be recorded, said means comprising a rotatable record, record rotating means, and electrical means actuated by the telephone circuits to automatically control the operation of said record rotating means; and manually operable means operable independently of said electrical means to control the operation of said record rotating means.

18. The combination with a subscriber's telephone set, of means to automatically cause an outgoing message to be reproduced and an incoming message to be recorded, said means comprising a rotatable record, record rotating means, a pair of sound boxes adapted to be operatively engaged with said record and electrical means actuated by the telephone circuits to automatically control the operation of said record rotating means; manually operable means operable independently of said electrical means to control the rotation of said record rotating means and manually operable means to selectively disengage either of said sound boxes from said record as desired.

19. The combination with a subscriber's telephone set of a casing, means within said casing to reproduce an outgoing message and record an incoming message comprising a sending and receiving record means to rotate said record, controlling means actuated by the electrical current in the telephone line to automatically control the operation of the record rotating means, said casing being provided with a recess to receive the receiver of the telephone and a normally open switch within said recess adapted to be closed by the weight of said receiver to complete the circuit from the line to said controlling device.

20. In a telegraphone of the type adapted to be secured to a subscriber's telephone set and having means for recording an incoming message and reproducing an outgoing message, a rotatable record, record rotating means, controlling means to govern the actuation of said record rotating means, said controlling means movable to a lower or an upper position, and connections from said controlling device to the receiver hook of said telephone to cause said receiver hook to occupy upper and lower positions corresponding to the upper and lower positions of said controlling device.

In testimony whereof I have affixed my signature in presence of two witnesses.

JOHN C. PAPADOPOULOS.

Witnesses:
 ALBERT G. PARKER,
 CHARLES W. TERRELL.